United States Patent Office 3,344,193
Patented Sept. 26, 1967

3,344,193
FLUORINATED DIALDEHYDES
Russell L. K. Carr, Grand Island, and Charles F. Baranauckas, Niagara Falls, N.Y., assignors to Hooker Chemical Corporation, Niagara Falls, N.Y., a corporation of New York
No Drawing. Filed Mar. 8, 1962, Ser. No. 178,259
9 Claims. (Cl. 260—601)

This invention relates to new compositions of matter and their methods of preparation. More specifically, the inventive concept herein resides in novel fluorinated dialdehydes.

The novel compositions of this invention may be illustrated by the following general formula:

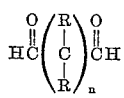

wherein $n$ is a number from two to three inclusive, and R is a substance selected from the group consisting of hydrogen, fluorine, perfluoroalkyl, perfluorocycloalkyl, perfluoroaryl, alkyl, cycloalkyl, aryl and mixtures thereof, and wherein at least one of the R's contains fluorine.

Typical of the dialdehydes of the present invention are:

2,2-difluoroglutaraldehyde;
3,3-difluoroglutaraldehyde;
2,2,3,3-tetrafluoroglutaraldehyde;
2,2,4,4-tetrafluoroglutaraldehyde;
2,2,3,4-tetrafluoroglutaraldehyde;
2,2,3,3,4-pentafluoroglutaraldehyde;
2,2,3,4,4-pentafluoroglutaraldehyde;
2-trifluoromethylglutaraldehyde;
2-pentafluoroethylglutaraldehyde;
2-heptafluoropropylglutaraldehyde;
2-nonafluorobutylglutaraldehyde;
3-trifluoromethylglutaraldehyde;
3-pentafluoroethylglutaraldehyde;
3-heptafluoropropylglutaraldehyde;
3-perfluoroundecylglutaraldehyde;
3-perfluorocyclobutylglutaraldehyde;
3-perfluorocyclopentylglutaraldehyde;
3-perfluorocyclohexylglutaraldehyde;
3-perfluorophenylglutaraldehyde;
2,2,3,4,4-pentafluoro-3-trifluoromethylglutaraldehyde;
2,2,4,4-tetrafluoro-3-trifluoromethylglutaraldehyde;
2,2,3-trifluoro-3-trifluoromethylglutaraldehyde;
2,2-difluoro-3-trifluoromethylglutaraldehyde;
2,2,3,3,4-pentafluoro-4-trifluoromethylglutaraldehyde;
2,2,3,3'-tetrafluoro-4-trifluoromethylglutaraldehyde;
2,3-difluoro-4-trifluoromethylglutaraldehyde;
3,3-difluoro-2-trifluoromethylglutaraldehyde;
3,3-difluoro-2-pentafluoromethylglutaraldehyde;
2,2,3,3-tetrafluoro-4-pentafluoroethylglutaraldehyde;
3,3-bis(trifluoromethyl)glutaraldehyde;
2,2,4,4-tetrafluoro-3,3-bis(trifluoromethyl)glutaraldehyde;
2,2-difluoro-3,3-bis(trifluoromethyl)glutaraldehyde;
2,2,4-trifluoro-3,3-bis(trifluoromethyl)glutaraldehyde;
2,2,4,4-tetrafluoro-3,3-dimethylglutaraldehyde;
2,2-difluoro-3,3-dimethylglutaraldehyde;
2,2,4-trifluoro-3,3-dimethylglutaraldehyde;
2,4-difluoro-3,3-dimethylglutaraldehyde;
3-ethyl-2,2,4,4-tetrafluoro-3-methylglutaraldehyde;
3,3-diethyl-2,2,4,4-tetrafluoroglutaraldehyde;
2,2-difluorosuccinaldehyde;
2,2,3,3-tetrafluorosuccinaldehyde;
2,2,3-trifluorosuccinaldehyde;
2,3-difluorosuccinaldehyde;
2-trifluoromethylsuccinaldehyde;
2-pentafluoroethylsuccinaldehyde;
2-heptafluoropropylsuccinaldehyde;
2-nonafluorobutylsuccinaldehyde;
2-perfluoroundecylsuccinaldehyde;
2-perfluorocyclobutylsuccinaldehyde;
2-perfluorocyclopentylsuccinaldehyde;
2-perfluorocyclohexylsuccinaldehyde;
2-perfluorophenylsuccinaldehyde;
2,2,3-trifluoro-3-trifluoromethylsuccinaldehyde;
2,2-difluoro-3-trifluoromethylsuccinaldehyde;
2-fluoro2-trifluoromethylsuccinaldehyde;
2-fluoro-3-trifluoromethylsuccinaldehyde;
3-ethyl-2,2-difluorosuccinaldehyde;
2,2-difluoro-3-methylsuccinaldehyde;
2,2-difluoro-3-phenylsuccinaldehyde;
2,2-bis(trifluoromethyl)succinaldehyde;
2-heptafluoro-propyl-2-trifluoromethyl-3,3-difluorosuccinaldehyde;
2,2-bis(pentafluoroethyl)succinaldehyde;
2,3-difluoro-2,3-bis(pentafluoroethyl)succinaldehyde;
2,2-difluoro-3,3-dimethylsuccinaldehyde;
2,2-diethyl-3,3-difluorosuccinaldehyde;
2,2-difluoro-3-methyl-3-trifluoromethylsuccinaldehyde;
2-trifluoromethyl-3-pentafluoroethylsuccinaldehyde.

The compositions of this invention are useful in the formation of polymers, have utility as chemical intermediates and have shown phytotoxic characteristics indicating utility as herbicides. As chemical intermediates these compositions can be converted into the corresponding fluorinated 2-hydroxypyrans by treating them with hydrogen in the presence of a catalyst.

The general equation illustrating the process of this invention is as follows:

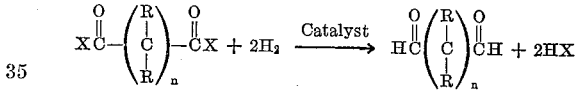

wherein X is a halogen selected from the group consisting of chlorine, fluorine and bromine and mixtures thereof, $n$ is a number from two to three inclusive and R is a substance selected from the group consisting of hydrogen, fluorine, perfluoroalkyl, perfluorocycloalkyl, perfluoroaryl, alkyl, cycloalkyl, aryl and mixtures thereof, and wherein at least one of the R's contains fluorine.

A specific and typical process of this invention is illustrated by the equation below:

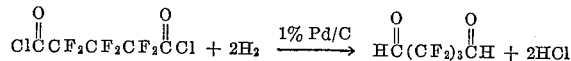

Although palladium on carbon and ruthenium on alumina are prepared catalysts, others which may be employed in the process of this invention include such metals as rhodium, nickel, palladium or platinum used as such or supported on materials such as clay, pumice, asbestos, carbon and glass. In addition, it is preferred that the paladium on carbon catalyst be one which has had prior use in related processes, although a freshly prepared catalyst may be employed also. Furthermore, the catalyst bed being used may be fixed or moving or the fluidized bed technique may be utilized.

In the process of this invention reaction temperatures in the range of one hundred and twenty-five to three hundred degrees centigrade may be used. although temperatures in the range of one hundred and thirty-five to two hundred and fifty degrees centigrade are preferred. Pressures near atmospheric pressure are also preferred although pressures above or below this may be used, if desired. The preferred mole ratio of hydrogen to diacid halide (for example, hexafluoroglutaryl chloride) is in the range of 1.8:1 to 20:1; however, mole ratios of from about 0.25:1 to 40:1 may also be employed.

It is therefore an object of this invention to provide compositions of matter hitherto not available in the prior art.

It is a further object of this invention to provide processes for the preparation of the compositions of this invention.

Another object of this invention is to provide a process for the preparation of these compositions which utilizes relatively inexpensive reducing agents.

Still another object of this invention is to provide a process which does not require relatively expensive equipment and which is readily adaptable to continuous processing techniques.

Other objects of this invention will become apparent to those skilled in the art upon further reading of this disclosure.

The following examples further illustrate the particulars of this invention, it being understood that the examples given are meant to be illustrative only and are not intended to limit this invention to the defined embodiments contained therein.

EXAMPLE 1

The apparatus used in this example comprised a tubular glass reactor approximately seven-eighths of an inch in diameter, and about seventeen inches long with an electrically heated section about twelve inches long and equipped with a system for the addition of hexafluoroglutaryl chloride and hydrogen gas. The reactor system was also equipped with a pressure relief valve (for purposes of safety), a thermocouple well and a thermocouple connected to a potentiometer, and a receiver connected to the exit end of the reactor which was also connected to a trap cooled in a Dry Ice-acetone cooling bath. The heated section of the reactor was filled with a one percent palladium-on-carbon catalyst, which had previously been used to prepare 2-hydroxy-3,3,4,4,5,5-hexafluorotetrahydropyran and 5 - hydroxy-2,2,3,3,4,4,-hexafluorovaleric acid by the hydrogenation of particular acid chlorides.

The system previously having been used, no prior purging with hydrogen was effected. Hexafluoroglutaryl chloride (1024.5 grams, 3.7 moles, approximate flow rate 0.21 mole per hour), and hydrogen gas (at about 4.1 moles per hours), were passed through the heated reactor during a period of about seventeen hours and fifty minutes. The temperatures near the center of the heated section of the reactor were in the range of one hundred and sixty-three to one hundred and sixty-seven degrees centigrade during this period. After the acid chloride addition was completed hydrogen flow was continued through the heated reactor for about twenty minutes and subsequently, while the reactor cooled. A total of eight hundred and seven grams of product was collected. Fractionation of the product led to the recovery of 2-hydroxy - 3,3,4,4,5,5-hexafluorotetrahydropyran and about three hundred and twenty grams of material boiling point ninety-seven to one hundred and twenty degrees centigrade, which was later shown to consist, in the main, of hexafluoro-1,5-pentanedial, $CHO(CF_2)_3CHO$. The identity of the latter dialdehyde was established in the following way. It has a boiling point of one hundred and four to one hundred and five degrees centigrade and is distillable as a very mobile liquid which has a refractive index near 1.323 at 22° C. and which solidifies exothermically to a hard polymeric material from which the original can be regenerated by heating to temperatures approaching one hundred and fifty degrees centigrade. Neither the liquid nor the solid yielded a precipitate with a nitric acid solution of silver nitrate thus precluding the presence of acid chlorides, other similarly active chlorine compounds, and ionic chloride. Both liquid and solid samples reduce ammoniacal silver nitrate, and the solid yielded a precipitate with 2,4-dinitrophenylhydrazine, melting point two hundred and five to two hundred and six degrees centigrade after recrystallization. The solid polymer (produced from the liquid boiling at one hundred and four to 5.5 degrees centigrade) had the following analyses: percent carbon, 28.68 percent, 28.43 percent, aver. 28.55; percent hydrogen 1.21, 1.20, aver. 1.21; percent F 52.9, 53.2, aver. 53.05. Calculated for $C_5H_2F_6O_2$: percent carbon, 28.86; percent hydrogen 0.97; percent F 54.8. Further reduction of the monomer (produced by heating the solid) with hydrogen over one percent palladium on carbon as described more fully in a copending application led to the formation of 2-hydroxy-3,3,4,4,5,5-hexafluorotetrahydropyran. All of these observations are consistent with the liquid, boiling at one hundred and four to 104.5 degrees centigrade, being $CHO(CF_2)_3CHO$ and the solid produced from this material being, in the main, an aldehyde polymer

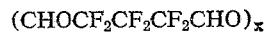

$(CHOCF_2CF_2CF_2CHO)_x$

EXAMPLE 2

The system of Example 1 was modified by replacing the receiver with a system such that the product being collected could be dropped at will into a stirred solution of aqueous sodium carbonate (one mole per five hundred milliliters of water, renewed as required). Hexafluoroglutaryl chloride (1,633 grams, 6.0 moles, aver, rate about 0.15 mole per hour), and hydrogen (approximate rate, 4.1 moles per hour), were reacted in the system just described which contained a one percent palladium on carbon catalyst, the latter having been purged for about ten hours with hydrogen gas at about one hundred and seventy degrees centigrate prior to its use. The reaction was effected during a period of about thirty-nine hours, the product being collected in the aqueous carbonate solution; during this time reaction temperatures near the center of the reactor were in the range of one hundred and fifty to one hundred and seventy degrees centigrade.

The carbonate solution was extracted with ether (six to seventy-five milliliter extractions for each six hundred to eight hundred milliliter of solution), and the ether extracts were saved as the "basic extract." After acidification of the resulting aqueous solution with hydrochloric acid, it was reextracted in a similar manner, the combined extracts now being saved as the "acidic extract". Distillation of the "acidic extract" led to the recovery of $HOCH_2CF_2CF_2CF_2COOH$, discussed and claimed in a copending application. Rectification of the "basic extract" led to the isolation of 2-hydroxy-3,3,4,4,5,5-hexafluorotetrahydropyran as well as fractions containing the hexafluoroglutaraldehyde of Example 1.

EXAMPLE 3

A system similar to that of Example 1 was charged with a catalyst of 0.5 percent ruthenium on alumina, the reactor was heated to a temperature of about one hundred and sixty degrees centigrade and the system was purged with hydrogen. Hexafluoroglutaryl chloride (one hundred and sixty-two grams, 0.59 moles), and hydrogen were passed through the heated reactor at flow rates of about 0.15 moles per hour, and 4.1 moles per hour respectively, over a period of about three hours and forty minutes, during which time the temperature in the reactor were in the range of one hundred to one hundred and eighty-six degrees centigrade. The product was collected and fractionated; fractions boiling in the range of one hundred to one hundred and nine degrees centigrade were examined by infrared analysis and found to contain starting material and the dialdehyde, $CHO(CF_2)_3CHO$, of Example 1.

The following examples demonstrate the utility of the compositions of this invention.

EXAMPLE 4

Polymerization of $CHO(CF_2)_3CHO$ was repeatedly demonstrated after distillation of this material. Refractionation of selected fractions in order to isolate additional amounts of it or to further purify existing amounts led to the isolation of liquid fractions which solidified on standing. Material which had been collected was refractionated at atmospheric pressure and material boiling point one hundred and one to one hundred and two degrees centigrade (thirty grams) was collected. After standing for about seventeen hours, it solidified exothermically to form a hard, solid polymer, which solidified and liquified in the temperature range of one hundred and thirty to one hundred and fifty degrees centigrade, and with the formation of some volatile monomer at temperatures somewhat below this.

EXAMPLE 5

A composition containing the aldehyde $$(CHO(CF_2)_3CHO)$$

and its polymer $(CHO(CH_2)_3CHO)_n$ was examined for herbicidal activity in preliminary greenhouse tests. Plots containing seedlings of rye, millet and cucumber were sprayed at the rate of four pounds per acre, when the seedlings were two to three weeks old. The spray comprised the above described composition in water which in turn contained about 0.5 volume percent of a mixture of emulsifier, xylene and isophorone. The seedlings were examined about two weeks after the application; the injury to the plants (or amount of top kill) indicated phytotoxicity suggesting utility as a herbicide.

Various changes and modifications may be made in the method and apparatus of this invention, certain preferred forms of which have been herein described, without departing from the spirit and scope of this invention. These modifications of this basic invention are to be regarded as within the scope and purview of this invention.

We claim:

1. A composition having the following general formula:

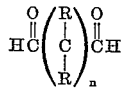

wherein $n$ is a number from two to three inclusive and R is selected from the group consisting of hydrogen, fluorine, perfluoroalkyl, perfluorocycloalkyl, perfluoroaryl, alkyl, cycloalkyl, and aryl, and wherein at least one of the R's contains fluorine.

2. The composition of claim 1 wherein the value of $n$ is two.

3. The composition of claim 1 wherein the value of $n$ is three.

4. A composition having the following formula:

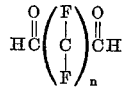

wherein $n$ is a number from two to three inclusive.

5. A composition having the following formula:

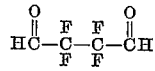

6. A composition having the following formula:

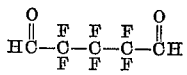

7. A composition having the following formula:

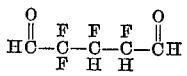

8. A composition having the following formula:

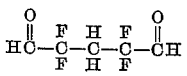

9. A composition having the following formula:

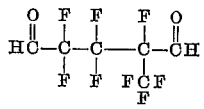

References Cited

UNITED STATES PATENTS

| | | | |
|---|---|---|---|
| 2,465,586 | 3/1949 | Gaspar | 260—601 |
| 2,779,792 | 1/1957 | Isler | 260—601 |
| 2,941,879 | 6/1960 | Goodhue | 71—2.7 |
| 2,959,476 | 11/1960 | Overbeek | 71—2.7 |

OTHER REFERENCES

Adams et al., Organic Reactions, vol. IV, copyrighted 1948, pp. 362—377.

Hudlicky: "Chemistry of Organic Fluorine Compounds," p. 159.

LEON ZITVER, *Primary Examiner.*

MAURICE A. BRINDISI, *Examiner.*

J. O. THOMAS, J. J. SETELIK, B. HELFIN,
*Assistant Examiners.*